United States Patent [19]
Humphries

[11] 3,901,758
[45] Aug. 26, 1975

[54] LAMINATING APPARATUS UTILIZING OFFSET ROLLERS

[75] Inventor: Donald N. Humphries, Oxford, Conn.

[73] Assignee: Seal Incorporated, Derby, Conn.

[22] Filed: May 14, 1973

[21] Appl. No.: 359,668

[52] U.S. Cl. .................. 156/499; 53/39; 100/140; 100/164; 156/555; 156/582; 156/583
[51] Int. Cl.² . B30B 7/00; B30B 15/34; B32B 31/20
[58] Field of Search ........ 53/39; 100/137, 140, 164; 156/306, 580, 583, 555, 499, 582

[56] References Cited
UNITED STATES PATENTS

| | | | |
|---|---|---|---|
| 3,481,376 | 12/1969 | Keller | 144/281 |
| 3,660,207 | 5/1972 | Schrade et al. | 156/555 |
| 3,779,845 | 12/1973 | Hutz et al. | 156/87 |

Primary Examiner—Douglas J. Drummond
Assistant Examiner—Robert A. Dawson
Attorney, Agent, or Firm—Schiller & Pandiscio

[57] ABSTRACT

The invention is an improved apparatus for bonding a protective transparent laminating film to articles in sheet form. The apparatus comprises a heating station for heating the work and a pair of pressure rolls for compressing the work so as to effect bonding. The heating station comprises vertically opposed members for heating the work and guiding it into the nip of the pressure rolls. The pressure rolls are disposed in an offset arrangement which minimizes the curling of the laminated product.

12 Claims, 11 Drawing Figures

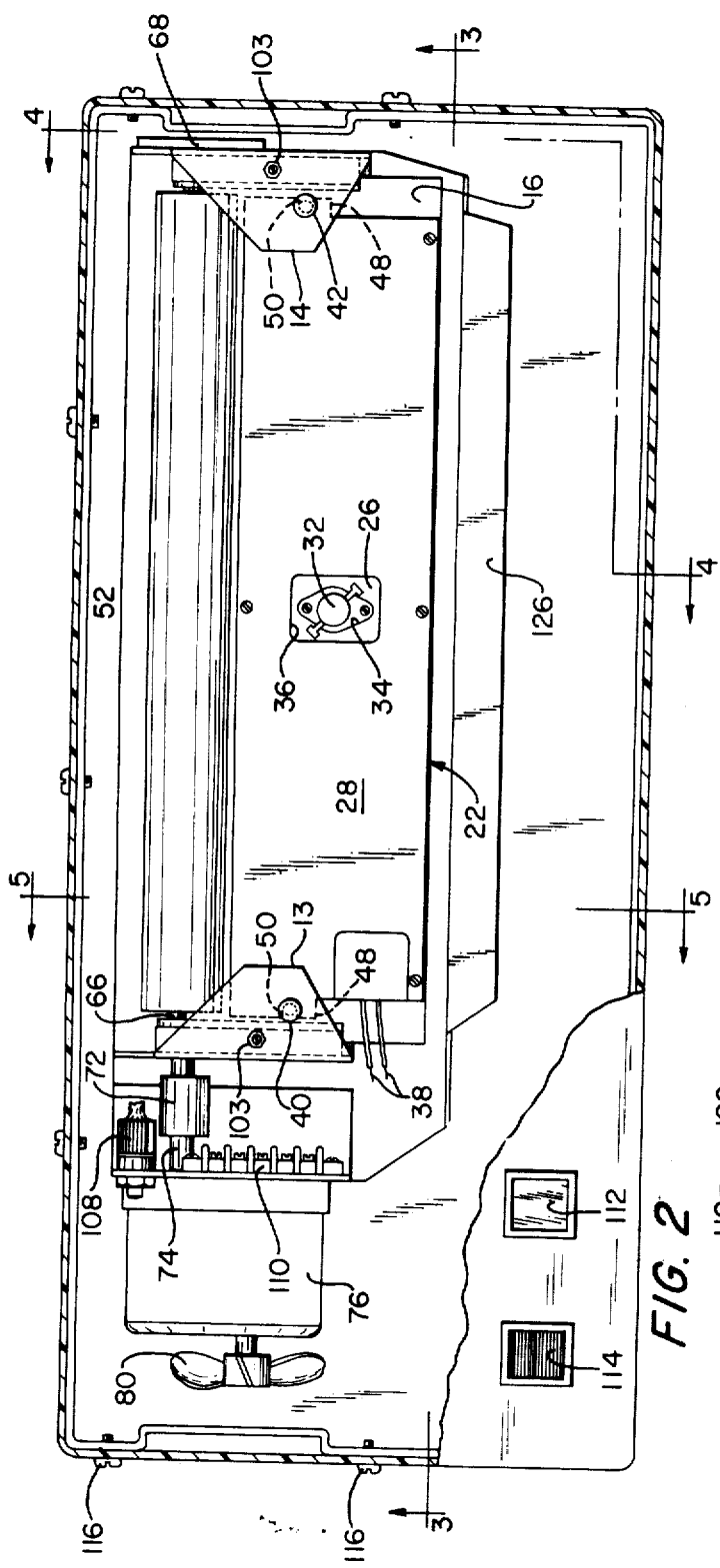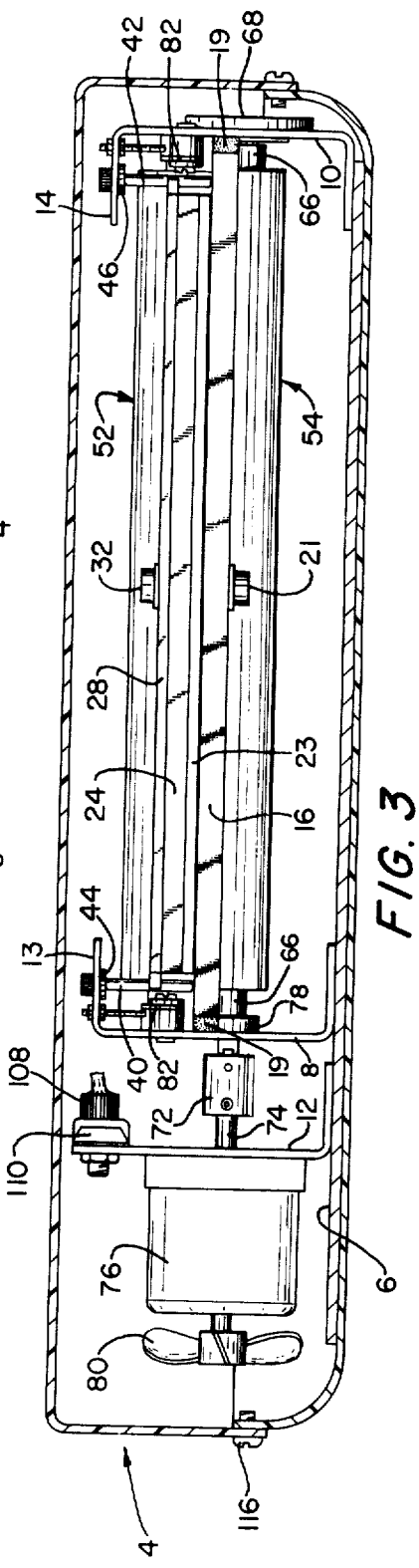

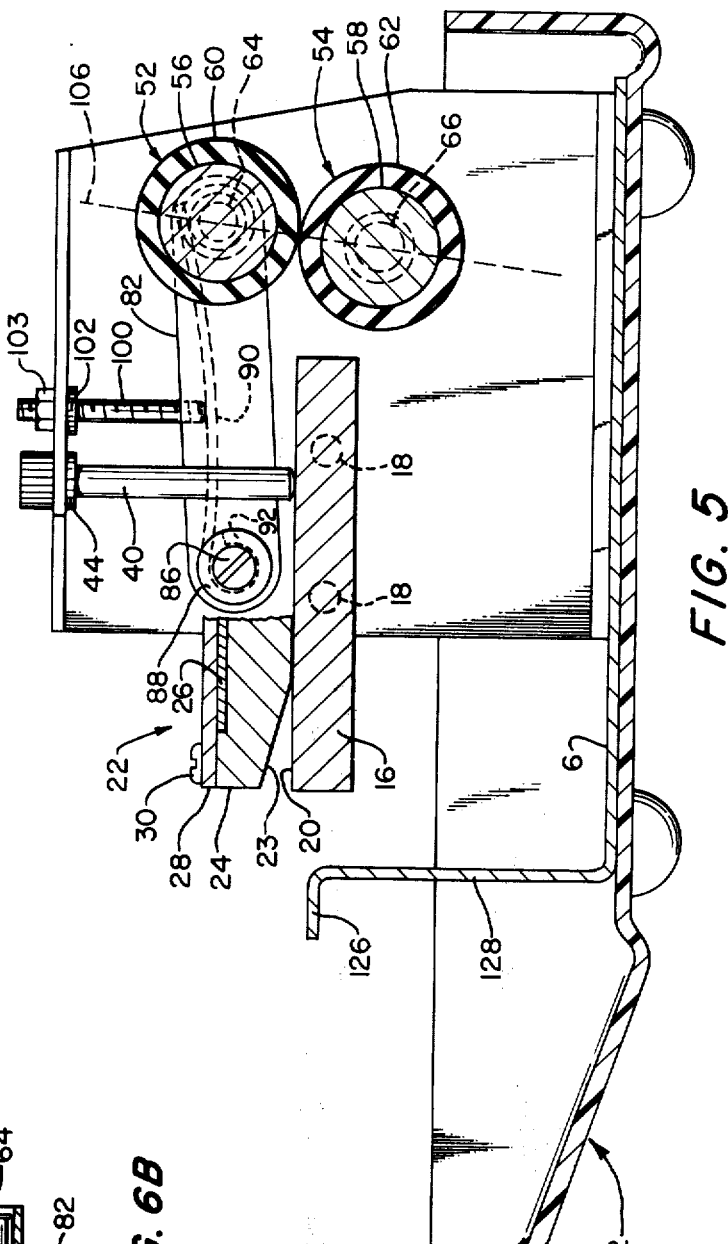
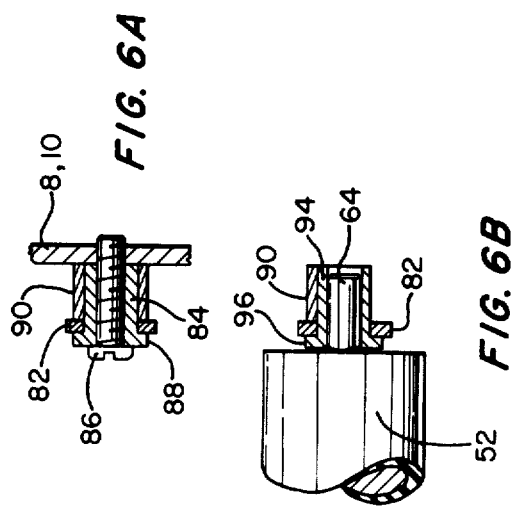

LAMINATING APPARATUS UTILIZING OFFSET ROLLERS

This invention relates to laminating apparatus and more particularly to an improved apparatus for laminating thin films of plastic material to paper and similar materials.

As is well known in the art, a variety of devices have been proposed in the past for laminating a transparent plastic film to one or both sides of a sheet of paper, e.g., a printed or typewritten document, photograph, etc., for the purpose of protecting it against ageing and physical abuse. Flat platen presses are generally considered unsatisfactory because they are slow and require the exercise of a great deal of care and skill to obtain substantially flawless lamination and avoid thermal degradation of the laminating film and the substrate to which the film is bonded. Rotary laminating presses also are well known, as exemplified by U.S. Pat. Nos. 3,143,454, 3,138,695 and 3,401,439.

Rotary presses generally are of two types. In one type the plastic film is heated immediately prior to its passage together with the substrate through a pair of pressure rolls. The other type avoids the use of a separate heating station for the film and instead utilizes heated pressure rolls that heat the sheet components of the workpiece precisely at the point of pressurization. For the most part, prior roller type laminators have been relatively complicated and also have limitations. A particular problem has been to provide application of heat evenly to the laminating materials without degrading them and with a minimum of control adjustments. For this reason, a great deal of effort has been expended in devising heated spring-biased resilient pressure rolls which exhibit relatively small variations in surface temperature during laminating operations. However, heated rolls have heat transfer problems complicated by the fact that the heating element is mounted in the roll. They also have other problems such as heater burn-out, roll surface degradation from heat, and the use of slip-rings and other means for supplying current to the heating elements. Many roller type laminators also have been designed to utilize laminating film in roll form, with means being provided to feed the film under tension to the pressure rollers for bonding to the substrate which is fed in separately. While such machines offer the advantage of avoiding wrinkling of the laminating film, they are relatively expensive to purchase and also to maintain in good operating condition.

When a protective laminating film is applied to only one surface of a substrate of paper or like material, the finished product has a tendency to curl. The same problem may occur, but to a lesser extent, when laminating film is bonded to both sides of the substrate. The curling problem also tends to be more severe when the laminating film is precut to the approximate size of the article to be laminated. In roller laminators that employ continuous webs of laminating film with the laminated products formed as a continuous strip, the curling problems can be alleviated by winding the products around a collecting reel which tensions the lamina and thereby eliminates the curl. A heating unit is usually interposed in advance of the collecting reel to resoften the adhesive and thereby facilitate removal of the curl by the tension imposed by the collecting reel. This approach to the curl problem increases the cost of the equipment and is unsuitable for a laminator designed to use precut sheets of laminating film.

Where a protective laminating film is applied to only one surface of a document or other paper article, the curling tendency is for the paper to assume a reverse bend with the laminated surface becoming concave. Thus if a heated workpiece consisting of a paper article with a laminating film overlying only the upper surface thereof is introduced between a pair of horizontal pressure rolls that are vertically aligned, the laminated product will curl upward as it passes out from between the rolls. Surprisingly, when a laminated article having a laminating film on both sides passes out from between the pressure rolls, any curling that occurs is also generally upward. I have discovered and it is a principal feature of this invention that the extent of curling can be materially reduced if the upper one of the pressure rolls is offset a selected amount from the lower roll. Furthermore, this solution does not involve reheating as is required when removing a curl by means of a collecting reel as previously described.

The primary object of this invention is to provide a roller-type laminator which overcomes the foregoing and other limitations of prior roller laminators.

Another object of this invention is to provide a roller-type laminator in which precut sheets of laminating film can be used.

A further object of this invention is to provide a laminator which is adapted to bond a laminating film to one or both sides of a substrate.

Another object is to provide a method of laminating a protective laminating film to a substrate so as to minimize curling of the laminated product.

Still another object is to provide a relatively inexpensive roller laminator of simplified construction which avoids the use of heated rolls, and is easy to operate and maintain.

A more specific object is to provide a roller laminator which is designed to minimize curling of the laminated product.

Described briefly, the invention comprises a pair of resilient pressure rollers that are unheated and a heat station located immediately in front of the rollers which consists of a heated substantially flat platen and a work support plate located below and normally engaging the platen, with the platen and work support plate being separable so as to permit a workpiece to be inserted between them and advanced into the nip of the pressure rollers. The workpiece, which consists of a document or like article with one or both of its opposite sides engaged with a precut sheet of plastic laminating film, is heated by the platen and the work support plate to a temperature high enough to activate the adhesive coating of the plastic film, and the heated workpiece is compressed by the rollers so that the adhesive layer forms a continuous uniform bond between the article and the film. A carrier folder for the workpiece is used to facilitate introduction thereof between the platen and work support plate. The rollers are yieldably mounted so as to be separable to the extent required to accommodate the workpiece and spring means are provided for pressing the two rollers into tight gripping and compressing relation with the workpiece. In the preferred embodiment of the invention, the work support plate is stationary and the platen assembly, which normally rests on the work support plate of its own weight, is capable of "floating" with respect to the work support plate as the work is inserted and moves between them. To materially reduce or substantially fully eliminate curling of the laminated product, the rolls are offset so as to force the work to bend in a predetermined direction as it exits from between them.

Other features and many of the attendant advantages of the invention are disclosed in or rendered obvious by the following detailed description which is to be considered together with the accompanying drawings in which:

FIG. 2 is a plan view of the machine of FIG. 1 with a portion of the housing broken away to expose the operating mechanism;

FIG. 3 is a vertical sectional view taken aloong line 3—3 of FIG. 2;

FIG. 5 is a cross-sectional view taken along line 5—5 of FIG. 2;

FIGS. 6A and 6B are enlargements of details of the machine;

In the drawings, like numerals refer to like parts.

Figure 1:
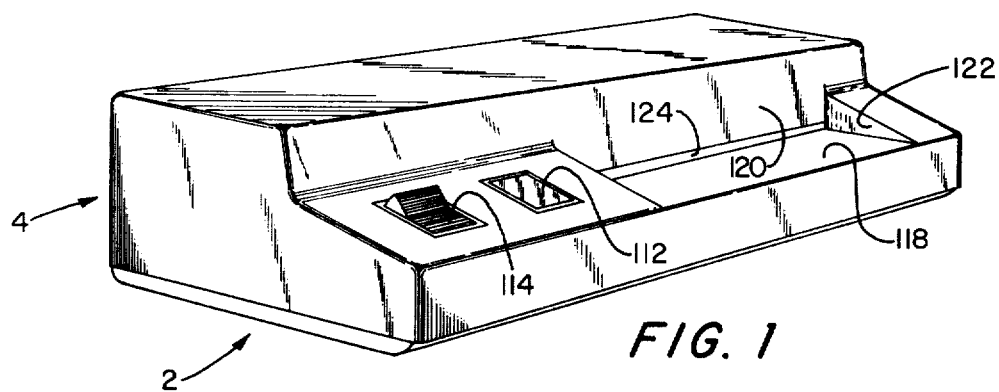
FIG. 1 is a perspective view of a laminator constituting a preferred embodiment of the invention.

A number of transparent film materials may be used for laminating with devices made in accordance with this invention. Polyester films, notably those consisting of a polyethylene glycol ester of terephthalic acid, are preferred because of their resistance to tearing, heat and abrasion, high strength, good ageing characteristics, substantial inertness, and high degree of imperviousness to moisture. These polyester films are provided with suitable adhesive layers which are transparent and should be capable of being heated without noticeable degradation and of forming a strong bond between the film and a suitable substrate. Typically the adhesive is a thermoplastic material, polyethylene being preferred, which is activated, i.e., softened, by heat and adheres to the adhesive under application of pressure.

Referring now to the drawings, the machine comprises a housing consisting of a base 2 and a cover 4 formed of plastic or other suitable material. The base 2 has a flat bottom wall, integral front, back and side walls. Mounted on and secured to the bottom wall of base 2 by screws (not shown) is a flat baseplate 6 which forms part of the chassis of the operating mechanism of the machine. The chassis includes three vertical mounting plates or brackets 8, 10 and 12 which are secured to the base plate. The upper ends of plates 8 and 10 are formed with right angle flanges 13 and 14 respectively. Extending between plates 8 and 10 is a relatively thick plate 16 which preferably is made of aluminum or an aluminum alloy or some other material combining high heat conductivity with adequate strength. Plate 16 is secured in place by machine screws 18 that extend through plates 8 and 10 and are screwed into tapped holes in the end faces of plate 16. Flat heat insulators 19, preferably made of silicone sponge rubber, are located between the end faces of plate 16 and brackets 8 and 10. Plate 16 has a flat upper surface 20 and is disposed so that the latter surface is substantially horizontal. A conventional bimetallic thermostat switch 21 is attached by screws to the flat underside of plate 16.

Plate 16 acts as a support tray or shelf and also as a guide for the workpiece to be laminated. Disposed above and resting on plate 16 is a heated platen or shoe identified generally by the numeral 22. The platen comprises a relatively thick plate 24 that has a flat bottom surface and is bevelled at its front end so as to form an inclined surface 23 to provide an entranceway or mouth for the workpiece. Plate 24 has a relatively wide and flat-bottomed groove or channel 25 in its upper surface to accommodate a flat electrical heater unit 26. The latter is concealed by a cover plate 28 that is secured tightly to plate 24 by screws 30. A conventional bimetallic thermostat switch 32 is secured by screws to the platen at approximately the center of its channel 25. The heater unit 26 and cover plate 28 are provided with aligned apertures 34 and 36 respectively through which projects the body of the thermostat switch and its terminal leads. Although not shown in detail, it is to be noted that the heater unit 26 preferably consists of an etched stainless steel foil electrical resistance heater element encased in a silicone rubber sheath which is secured to the platen by a suitable heat resistant cement. The terminal leads of the heater unit are brought out on one end as shown at 38. Of course, other forms of electrical heater units may be used.

Extending through correspondingly located holes in flanges 13 and 14 are screws 40 and 42 which are screwed into nuts 44 and 46 respectively. Nuts 44 and 46 are affixed to flanges 13 and 14. Screws 40 and 42 extend down close to the upper surface of plate 16. Cover plate 28 has side extensions 48 which extend beyond the ends of the plate 24 and are notched as shown at 50 so as to allow screws 40 and 42 to extend down along side the ends of the platen plate 24. Notches 50 are located and sized so that the platen assembly 22 is free to move vertically with screws 40 and 42 acting as guides that restrain the platen assembly against movement side to side and fore and aft.

Brackets 8 and 10 also act as support members for two rollers 52 and 54. As shown in FIG. 5, rollers 52 and 54 comprise solid metal cores 56 and 58 of circular cross-section and cylindrical covers or sheaths 60 and 62 respectively made of a suitable elastomer such as silicone rubber. The sheaths 60 and 62 may be affixed to the cores by a shrink-fit or may be molded in place. In any event, the sheaths and cores form integral structures. Affixed in the opposite ends of cores 56 and 58 are coaxial dowels 64 and 66. The dowel 66 at the right hand end of roller 54 (as seen in FIG. 3) extends through an oversized hole in bracket 10 and is journalled in a bearing plate 68 which is affixed by screws 70 to bracket 10. The dowel 66 at the opposite end of roller 54 extends through bracket 8 and is attached to a coupling 72 mounted on the output shaft 74 of a gear reducer section of an electric motor unit 76 that is affixed to bracket 12. A bearing 78 affixed to bracket 8 may be used to journal the dowel 66 that is attached to coupling 72. A cooling fan 80 is attached to and driven by another output shaft of the motor unit.

The upper roler 52 is supported by a pair of elongate guide arms 82, each of which is pivotally secured at one end to one of the brackets 8 and 10. Referring now to FIG. 6A, a bushing 84 is mounted by a screw 86 to the inner surface of each of the brackets 8 and 10. Each bushing has a flange 88 adjacent to the head of its mounting screw 86. Each bushing 84 extends through a suitably sized hole in the associated guide arm 82 and acts as a bearing for the guide arm. Each bushing also acts as a mount for one end of a leaf spring 90. The aforesaid end of each spring 90 is bent to form a collar or loop portion 92 which embraces the associated bushing 84.

The end dowels 64 of upper roller 52 are rotatably mounted to the rear ends of guide arms 82. Referring now to FIG. 6B, a bushing 94 is mounted on each dowel. Each bushing 94 has a flange 96 and extends through a suitably sized hole in the rear end of one of the guide arms 82. The springs 90 are long enough to extend rearwardly over the bushings 94, with the guide arms situated between the bushing flanges 96 and springs 90. The guide arms coact with the bushings 94 to limit axial movement of roller 52 while permitting the latter to rotate on its axis. The roller 52 is urged downward into engagement with roller 54 by the leaf springs 90. The latter are biased by screws 100 which extend through holes in flanges 13 and 14 and are screwed into nuts 102 affixed to the aforesaid flanges. Screws 100 are adjusted so as to bear against the springs which tend to bend as shown in FIG. 5 while exerting a downward pressure on the roller 52 through bushings 94. The downward pressure exerted on roller 52 can be adjusted by moving the screws up or down. Lock nuts 103 are used to hold screws 100 in a set position.

As seen in FIG. 5, the roller 54 is disposed at a height such that it is substantially tangent to the plane of the upper surface of the work support plate 16. Additionally, the length of the guide arms is such that when the two rollers are engaged, the axes of the two rollers are offset so that a plane common to their axes will be inclined substantially as shown by the dotted line 106. Preferably the rollers are disposed so that the axis of roller 52 is offset rearwardly of the axis of roller 54 by an angle between about 5° and about 12° and preferably between about 6° and 8° from the vertical. By way of example, if the rollers each have a diameter of 1⅛ inch, the roller 52 is disposed so that its axis is set back of the axis of roller 54 by about one-eighth inch.

Referring now to FIGS. 2 and 3, the machine also includes a solid state relay 108 and a terminal board 110 affixed to bracket 12. These components are connected in a circuit in the manner shown in FIG. 9 to thermostats 21 and 32, heater element 26 and motor 76. Also connected in the circuit are a Ready light 112 and an ON-OFF switch 114 which are mounted in the machine's cover 4.

The cover 4 fits down over the base 2 and is secured to it by screws 116. One or more of the side and rear walls of the cover and preferably also the base are provided with vent holes (not shown) to facilitate circulation of cooling air by fan 80. The front side of the cover is formed with a horizontal shelf 118 and a vertical front wall section 120 located between vertical side wall sections 122 plus a horizontal elongated opening 124 formed therebetween. The inner edge of shelf 118 is supported by a flange 126 formed on the upper end of a vertical extension 128 of baseplate 6. Shelf 118 is located so that its upper surface is at substantially the same level as the upper surface of plate 16. Preferably the opening 124 is located within about one-fourth inch of the front edge of plate 16. The rear side of the platen 22 also extends close to the nip formed by rollers 52 and 54. Preferably the spacing between platen 22 and roller 52 is about ¼ – ⅜ inch.

Figure 9:
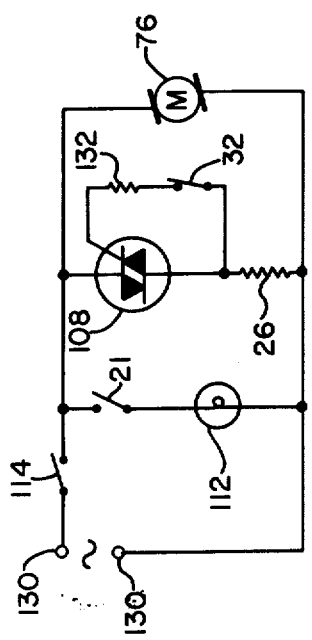
FIG. 9 is a diagram of the power circuit of the machine.

As seen in FIG. 9, the circuit comprises two input terminals 130 adapted for connection to a suitable source of a.c. current. In practice, terminals 130 constitute the prongs of the plug connector of a power cord (not shown) which is connected to terminal board 110 and extends out through a hole in the base 2 or the cover 4 of the housing. The solid state relay 108 comprises a triac having its $T_1$ and $T_2$ terminals connected in series with switch 114 and heater unit 26 between input terminals 130. Thermostat 21 and READY light 112 are connected in parallel with the triac and the heater unit. Motor 76 is also connected in series with switch 114 and terminals 130. The gate electrode of the triac is connected by a bias resistor 132 and thermostat 32 to the junction of the triac and heater unit 26. Thermostat 21 is normally open and is set to close when the work support plate reaches a suitable temperature indicative of the fact that the machine is ready to carry out a laminating operation. Light 112 goes on when thermostat 21 closes. The thermostat 32 is normally closed and is set to open when the platen assembly reaches a temperature level above which the work may suffer heat damage. The temperature settings selected for the two thermostats depend on (1) the activating temperature of the adhesive coating on the laminating film (or films) that form a part of the workpiece and (2) the resistance to heat degradation of the film and other components of the workpiece. Typically with the platen assembly and work support plate each having a thickness in the order of ⅜ – ½ inch and using a laminating film coated with an adhesive that is activated in the range of about 250°F and about 325°F, the thermostat 21 is set to close at about 250°F and the thermostat 32 is set to open at about 350°F. Assuming that switch 114 is closed, triac 108 will conduct and heater unit 26 will be energized as long as thermostat 32 is closed. The triac will stop conducting and the heater unit will be deenergized when thermostat 32 opens. Motor 76 will operate as long as switch 114 is closed.

Platen assembly 22 and work support plate 16 are made sufficiently massive such that at temperatures between 250°F and 350°F the amount of heat which they give up to a typical workpiece as the latter moves through the machine causes their temperatures to drop no more than about 5°–20°F when the heater unit is off, and the heater unit is made so that its heat output is sufficient to maintain the platen assembly and the workpiece at a substantially constant temperature during normal use of the machine. It has been found that if the platen assembly and work support plate are made of aluminum, and if the motor is adapted to rotate roller 54 at a surface speed of 50 inches/ minute, highly satisfactory laminations can be achieved following the procedure described below if (a) the heater unit has a watt density of about 28 watts/square inch; (b) the platen assembly 24 has a maximum thickness of one-half inch (with a heater channel depth of about one-sixteenth inch) and a depth (i.e., front to back dimension) of 3 inches; (c) the support plate 16 is three-eighth inch thick and 3 inches deep; and (d) thermostats 21 and 32 are set to close and open respectively at 250°F and 350°F respectively.

Figure 7:
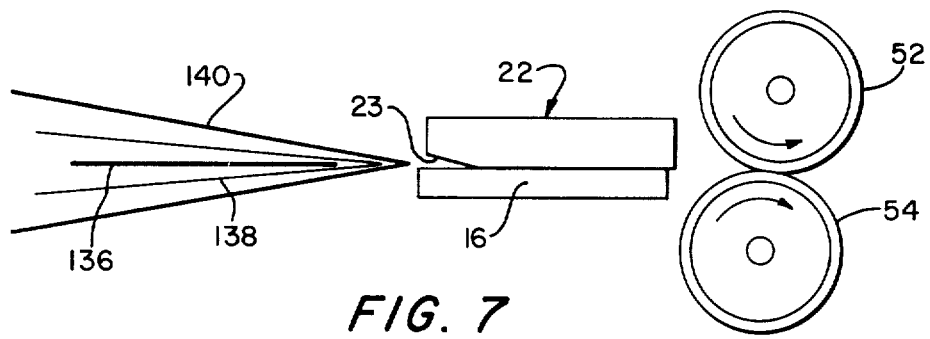
FIGS. 7 and 8 are schematic views showing various elements and the process of lamination.
Figure 8:
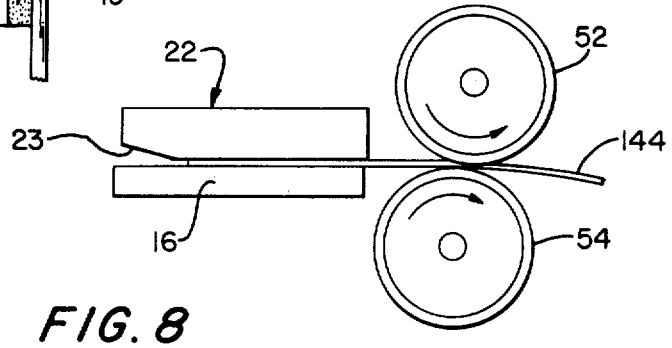
Figure 4:
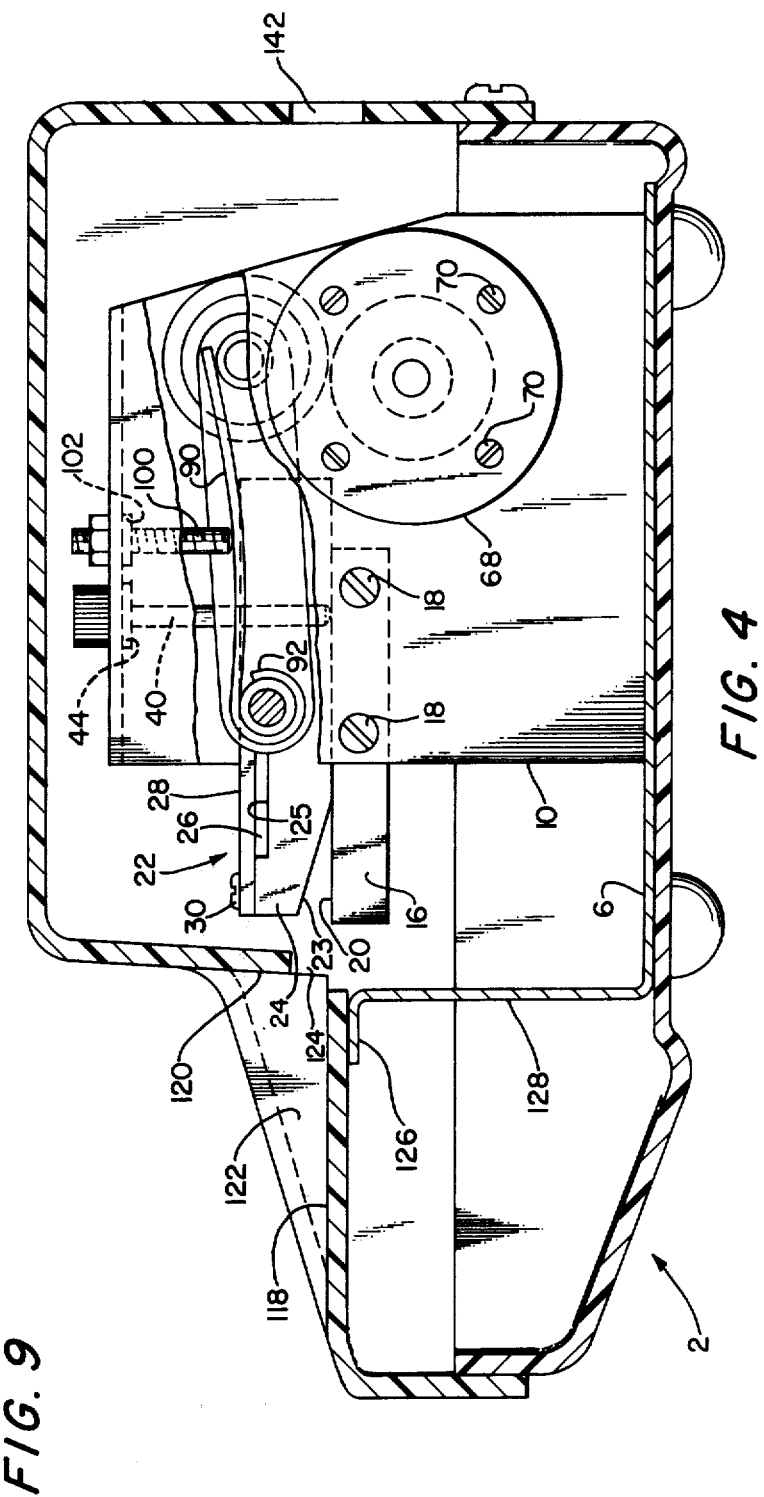
FIG. 4 is a vertical sectional view, with portions broken away and removed, taken along line 4—4 of FIG. 2.

FIGS. 7 and 8 illustrate how a typical laminating operation is effected. In this case assume that the object 136 to be laminated is a photograph. A sheet of 0.001–0.003 inch laminating film coated on one side with a heat activatable adhesive is folded over the photograph as shown at 138, and the resulting workpiece is placed within a carrier folder 140 which is relatively stiff. By way of example, the folder may be formed of 0.010 inch thick Manila stock. The folded end of the carrier folder is inserted through the opening 124 and pushed between platen assembly 22 and support plate 16. The carrier is pushed through between the platen assembly and work support plate until its folded leading edge enters the nip between the two rollers, whereupon the folder is gripped and propelled rearwardly. The laminated product 144 exits the machine via a horizontally elongated discharge slot 142 formed in the rear wall of the machine cover (see FIG. 4). Since the platen assembly is resting on the plate 116 under solely its own weight, it moves up on screws 40 and 42 relatively easily under the separating force exerted by the carrier folder as it is pushed in by the operator. Since the depth or front to back dimensions of the platen assembly and work support plate need only be in the order of about 3 inches and since these elements can be located close to the rollers, it is an easy matter for the operator to quickly feed the workpiece in far enough for it to be picked up by the rollers. The platen assembly and the work support plate coact to guide the workpiece so that the leading edge of the carrier will move straight into the nip of rollers 52 and 54. Additionally, they tend to smoothen out the workpiece and thus eliminate wrinkles. Most importantly, they heat the workpiece up to the necessary adhesive-activating temperature before it is engaged by the rollers. Although pressure is exerted on the workpiece by the platen, substantially most of the bonding of laminating film to the object is effected by the pressure exerted by the rollers, and this pressure can be modified as required by adjusting screws 100. Actually the unheated rollers may be viewed as chill rollers since they tend to rapidly cool the work and thereby set the adhesive which bonds the laminating film to the woork object.

Of course, it is not necessary to laminate both sides of a work object, in which case a single sheet of laminating film (having the same or slightly larger dimensions than the work object) is placed in the carrier in engagement with one side of the work object.

As previously noted, when a laminated article passes out from between a pair of vertically aligned pressure rollers, it tends to have a curl. Thus, for example, if in the illustrated machine the rolls 52 and 54 were vertically aligned, and a workpiece comprising a single sheet of laminating film overlying a sheet to be laminated should be fed through the machine in a carrier 140, the resulting laminated product would tend to be curled upward, i.e., the laminated surface would be concave. However, if the rolls are offset as provided by the present invention, the laminated product tends to have little or no curl. Because of the offset relationship of the rolls, the carrier tends to be forced downward (as shown in FIG. 8) as it passes out from between the rolls. This downward influence and resulting downward bending is due to the offset relationship of the rolls coupled with the tension exerted by the holding action of the platen assembly and work support plate on the trailing portion of the workpiece. Also, the hot workpiece is cooled by the rolls enough to set the adhesive as it is being compressed and forced downward in its travel.

Figure 10:
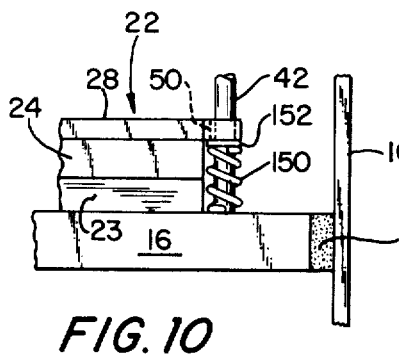
FIG. 10 is a fragmentary sectional view of a modification of the invention.

Although it is not necessary, means may be provided for facilitating separation of the platen assembly 22 from the plate 16 by insertion of the carrier with the enclosed workpiece. This modification of the invention is shown in FIG. 10 where a compression spring 150 surrounds the guide screw 42, with the bottom end of the spring directly engaging plate 16 and the upper end engaging a washer 152 that bears against the underside of the extension 48 of the platen assembly cover plate 28. Although not shown, it is to be understood that a like compression spring 150 is similarly mounted on the other guide screw 40. In this modification, the springs have a stiffness and size such that they cannot hold the platen assembly out of engagement with plate 16 but act to balance off a portion of the total weight of the platen assembly, with the result that less of a wedging force is required to be exerted by the inserted carrier to effect separation of the platen assembly from plate 16. Preferably the springs are adapted to balance off about half of the weight of platen assembly thereby assuring intimate contact and thus good heat transfer between the platen assembly and the carrier.

As a further modification, a second flat electrical heater unit may be incorporated in the work support plate 16 to assure adequate heating thereof. However, this modification is not essential since adequate heating of the plate occurs from its engagement with the platen assembly. Placing the heater unit within plate 16 rather than platen plate 24 also is contemplated, but is not preferred since when an article is to be laminated on only one side, the operator customarily prefers to feed the work in with the laminating film on top. Having the heater in the platen assembly assures that the platen plate 24 will at least be as hot as plate 16 and thus capable of adequately activating the adhesive layer of the laminating film.

Still other modifications will be obvious to persons skilled in the art from the foregoing description.

Although the illustrated embodiments have been described in connection with application of laminating film to articles in sheet form, they also may be used for dry-mounting articles to supporting substrates using conventional dry-mounting tissue. Furthermore, as persons skilled in the art will appreciate, laminating and dry-mounting may be accomplished simultaneously.

What is clamed is:

1. Plastic film laminating apparatus having a single pair of pressure rolls each mounted for rotation on its own axis and comprising: means resiliently biasing said rolls into pressure engagement with each other, a heating station comprising first and second heat conductive means positioned so as to guide a multi-sheet workpiece to be laminated into the nip formed by said rolls, said first and second means being disposed one above the other and having flat confronting surfaces that are in engagement with each other, means mounting said first and second means for relative separating movement of said confronting surfaces so that a workpiece to be laminated may be inserted between them and positioned in the nip of said rolls, said mounting means including guide means for preventing horizontal movement of said first and second means, means for heating said first and second means, and drive means for rotating at least one of said rolls to draw said workpiece from said heating station through said rolls so that the sheets of said workpiece are forced by said rolls into face-to-face pressurized contact, said rolls being disposed so that their axes of rotation are parallel to the planes of said confronting surfaces and lie in a common plane that extends at an acute angle to at least portions of the planes of said confronting surfaces, whereby the axis of one roll is offset with respect to the axis of the other roll.

2. Apparatus according to claim 1 wherein said axes and said surfaces are substantially horizontal.

3. Apparatus according to claim 2 wherein the axes of said rolls lie in a common plane that extends at an angle of between about 5° and about 12° to a plane that is parallel to said axes and normal to said confronting surfaces.

4. Apparatus according to claim 1 wherein said first means is mounted above said second means and said second means is fixed while said first means is moveable vertically relative to said second means.

5. Apparatus according to claim 4 wherein the confronting surface of said second means lies in a plane that is substantially tangent to one of said rolls.

6. Apparatus according to claim 4 wherein said first means includes an electrical heating element.

7. Plastic film laminating apparatus comprising a pair of pressure rolls, a pair of spaced arms rotatably supporting one of said rolls for rotation on its own axis, means rotatably supporting the other of said rolls for rotation on its own axis, said rolls being parallel to one another, a pair of side plates, means moveably mounting said arms to said side plates so that said one roll can move into and out of engagement with said other roll, means resiliently biasing said one roll into pressure engagement with said other roll, a heating station comprising first and second heat conductive metal plates positioned so as to guide a multi-sheet workpiece to be laminated into the nip formed by said rolls, said first and second plates having confronting surfaces that normally engage one another, means mounting said first and second plates for relative separating movement of said confronting surfaces so that a workpiece to be laminated may be inserted between them and positioned in the nip of said rolls, means for heating at least one of said first and second plates, and drive means for rotating at least one of said rolls in a direction to draw said workpiece from said heating station through said rolls so that the sheets of said workpiece are forced together by said rolls, said confronting surfaces having end portions located close to the nip of said rolls that are located in planes that are parallel to the axes of rotation of said rolls, said rolls being offset so that their axes lie in a common plane that extends at an acute angle to the plane of said end portions, whereby to minimize curling of said workpiece as it passes out from between said rolls.

8. Apparatus according to claim 7 wherein said heating means comprises an electrical resistance heating element that is mounted to one of said first and second plates.

9. Apparatus according to claim 8 comprising first and second thermostat switches mounted to said first and second plates respectively, said first and second thermostat switches being adapted to operate at a first lower temperature and a second higher temperature respectively, an indicator light, means connecting said indicator light to said first thermostat switch so that said light is energized when said first thermostat switch is operated, and means connecting said second thermostat switch to said heating element so that said heating element is energized so long as said second thermostat switch is below said second higher temperature.

10. Apparatus according to claim 9 wherein said other roll is rotatably supported by said side plates.

11. Apparatus according to claim 10 wherein resilient biasing means comprise leaf springs pivotally mounted to said side plates and engaging axial extensions of said one roll, and means urging said leaf springs against said axial extensions.

12. Apparatus according to claim 9 wherein said side plates are located at opposite ends of said second plate, and further comprising means affixing the ends of said second plate to said side plates, said first plate being located above said second plate, said means mounting said first and second plates comprising guide means affixed to said side plates for preventing endwise and lateral movement of said first plate while simultaneously permitting vertical movement thereof.

* * * * *

UNITED STATES PATENT OFFICE
CERTIFICATE OF CORRECTION

Patent No. 3,901,758                 Dated August 26, 1975

Inventor(s) Donald N. Humphries

It is certified that error appears in the above-identified patent and that said Letters Patent are hereby corrected as shown below:

Column 10, line 8, -- plane -- should be "planes"

Column 10, line 27, -- 9 -- should be "7"

Column 10, line 34, -- 9 -- should be "7"

Signed and Sealed this fourteenth Day of October 1975

[SEAL]

Attest:

RUTH C. MASON
*Attesting Officer*

C. MARSHALL DANN
*Commissioner of Patents and Trademarks*